Aug. 3, 1965   R. C. McDOWELL   3,198,353
BULK MATERIAL LOADING SYSTEM
Filed Dec. 24, 1962   7 Sheets-Sheet 1

INVENTOR.
ROBERT C. McDOWELL
BY
Justin W. Macklin,
ATTORNEY.

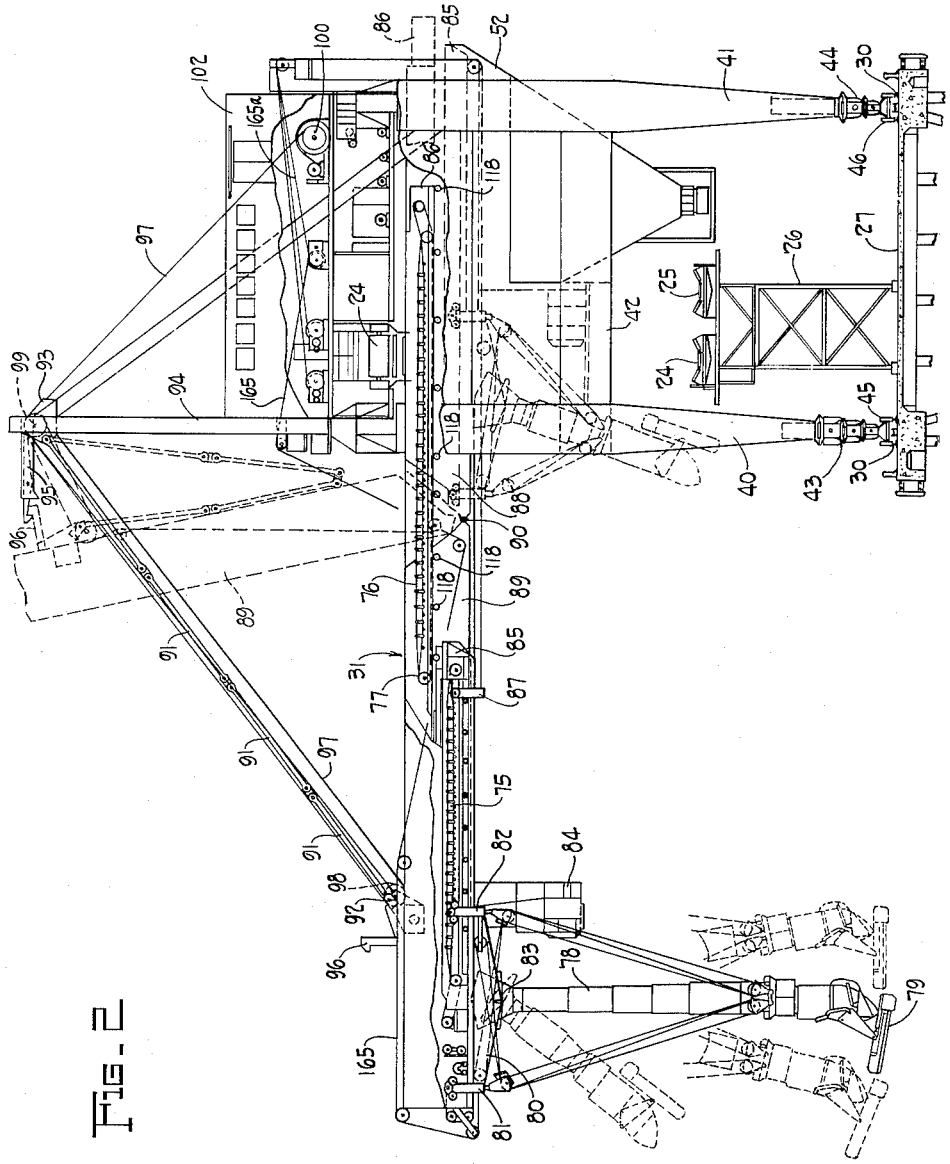

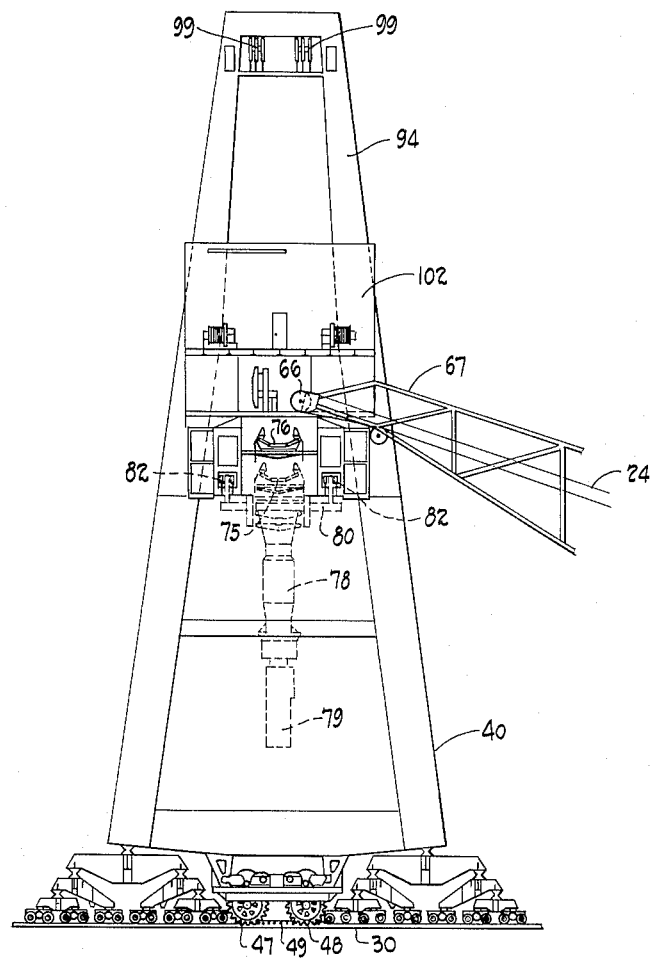

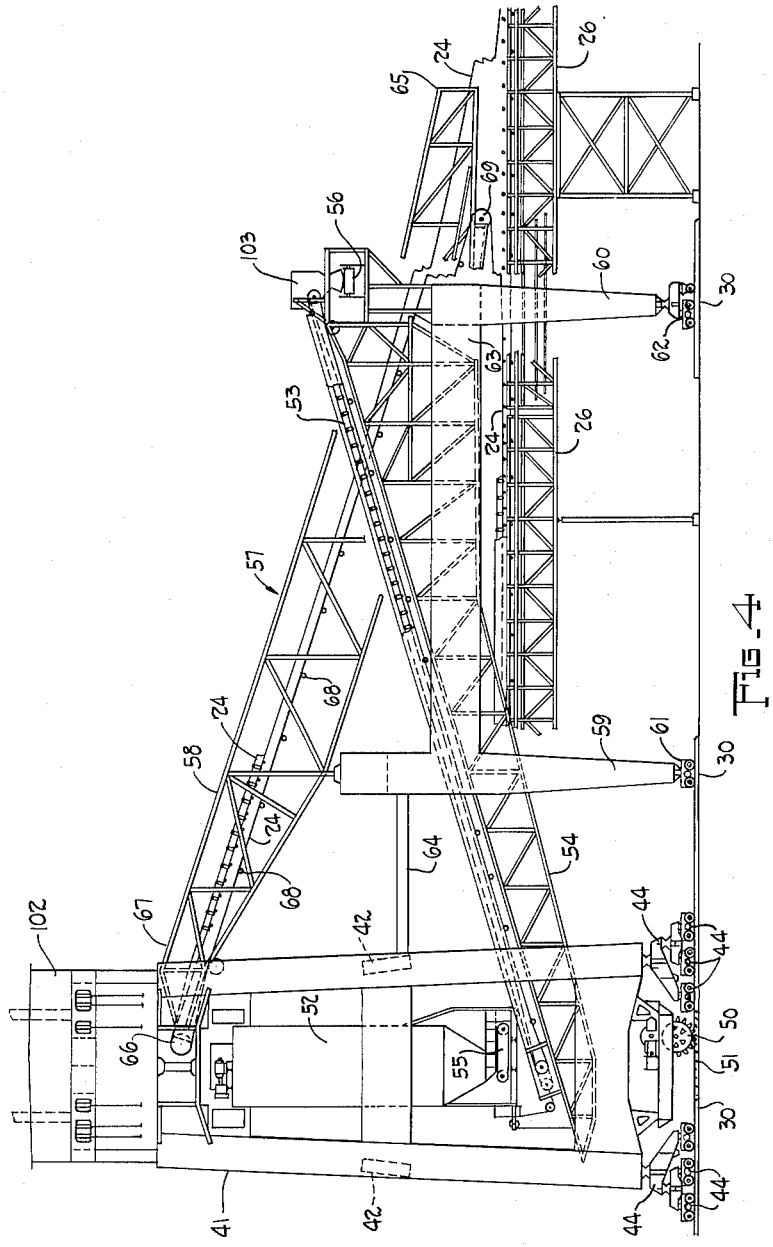

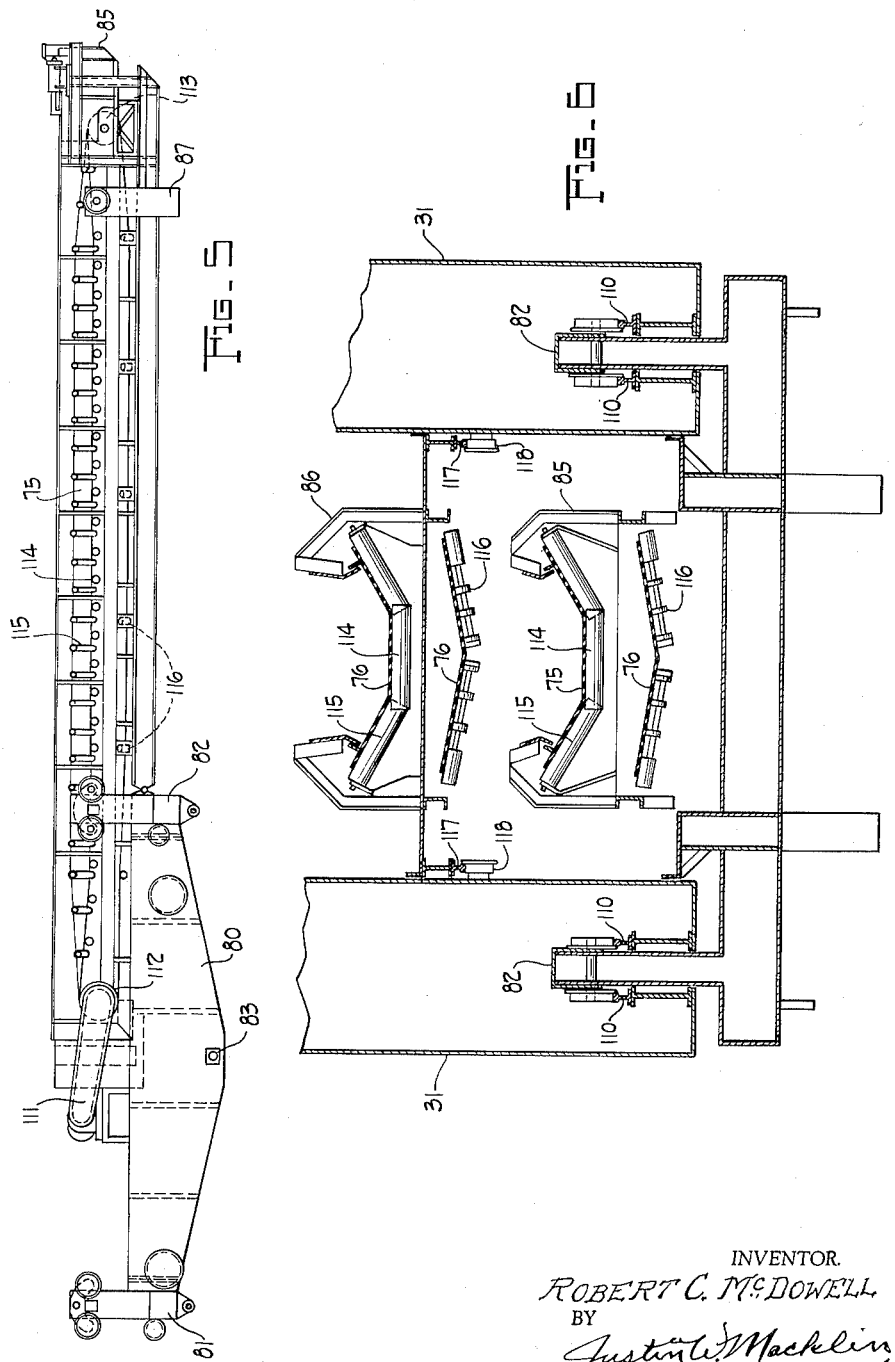

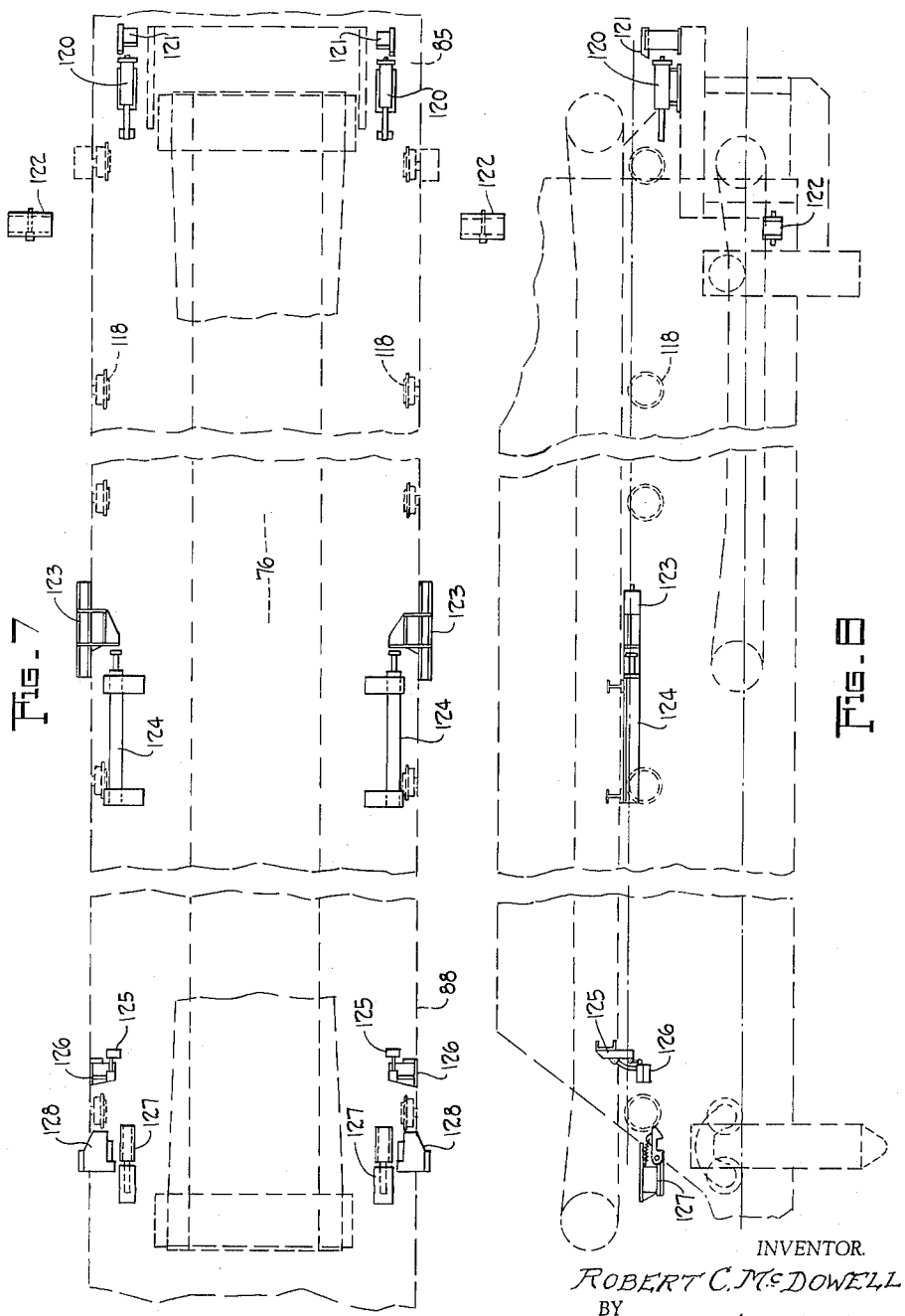

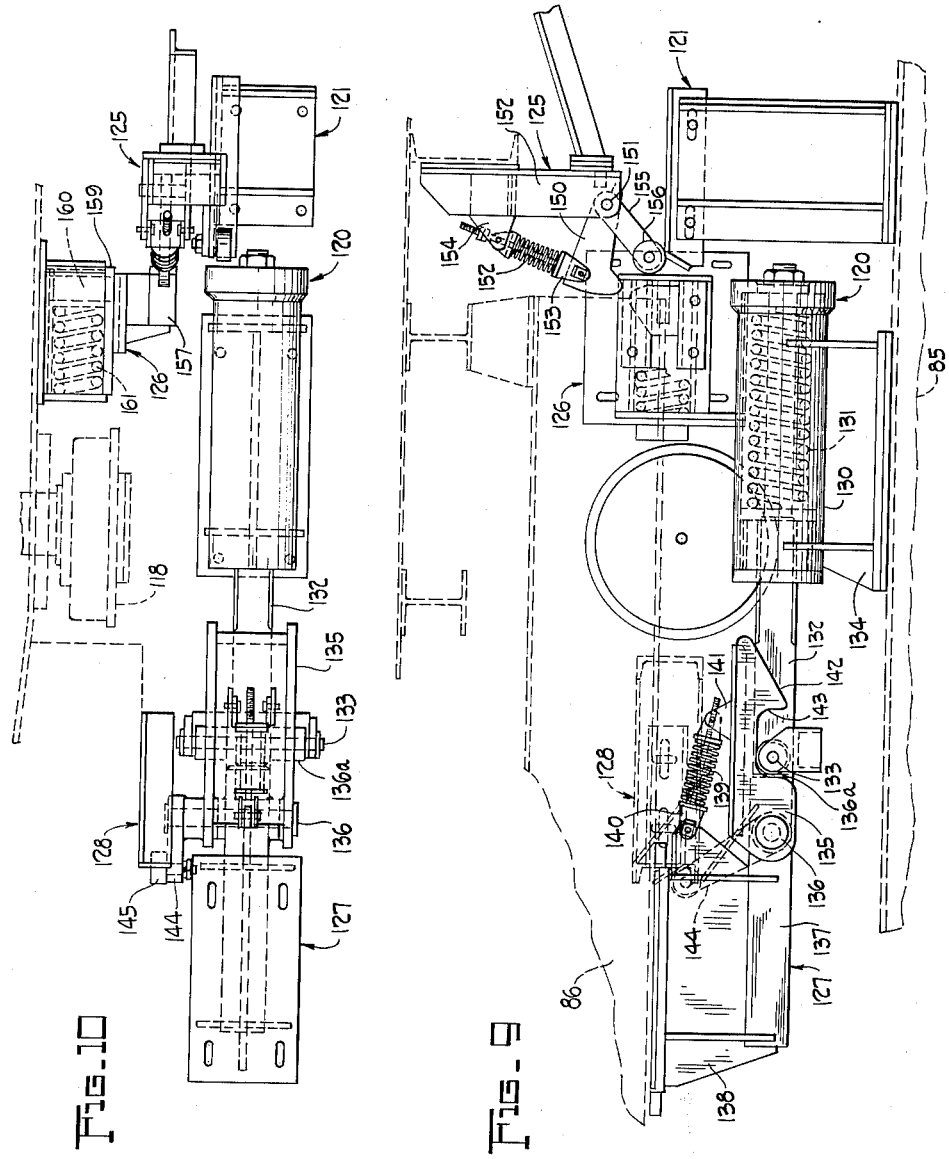

United States Patent Office 3,198,353
Patented Aug. 3, 1965

3,198,353
BULK MATERIAL LOADING SYSTEM
Robert C. McDowell, Cleveland, Ohio, assignor, by mesne assignments, to McDowell-Wellman Engineering Company
Filed Dec. 24, 1962, Ser. No. 246,694
11 Claims. (Cl. 214—14)

This invention relates to an apparatus for loading coal or other bulk material into the holds of ships or colliers.

A general object attained by the system and apparatus of the present invention is that of efficiently and satisfactorily handling bulk materials in quantities and at loading rates far exceeding any present ship loading apparatus.

In the operation of the present invention an important advantage is that it is capable of handling materials of varying particle sizes, from small to large lumps, with a minimum of breakage, which is particularly desirable in the handling and loading of ships with prepared coal, and such materials as beneficiated iron ore pellets, phosphate briquettes, and coke. It is usually desirable, although perhaps less important, to avoid breakage resulting in excessive dust when handling slack coal.

The embodiment of the invention herein shown and described is particularly intended to be used for loading coal into colliers. It includes a complete system of transferring the material from railway cars to vessels, including rapid moving and dumping of the cars and delivering the bulk material to a novel system of conveyor belts leading to a ship loader or loaders and delivering it suitably distributed into ships.

The general object includes so arranging and engineering the system and apparatus as to effectively operate at a loading rate of as much as ten thousand tons of coal per hour delivered into a ship by each loading apparatus.

Another object is to so arrange the system that it may be most effective and continuous in operation; handling the material with maximum efficiency; a minimum of breakage of the lumps, and with very great savings in the shipper's time and money "in turn around of colliers."

An object attained by the present invention is the provision of a loading apparatus which is capable of serving and effectively and rapidly loading the largest colliers afloat or planned, i.e., of over 140 ft. beam and well over one hundred thousand tons capacity. In this connection, the loading apparatus assembly units receiving the coal from large conveyor belts bringing the coal from the car dumpers each includes a traveling tower capable of being moved from one hatch to another and having loading booms movable transversely of the ship a greater distance than heretofore possible.

An important advantage of the present invention is that provision may be made such that coals of different kinds and quality may be mixed to suit the specifications of particular buyers an shippers with precise and uniform blending of four or even five kinds of coal combined into a single blend and uniformly loaded at a high rate of delivery.

The system lends itself to advantages such as using a plurality of revolving car dumpers delivering to hoppers which may be equipped with level sensing devices; level sensing and control devices for the belts for transfer and conveying to the ship loader on the pier; all transfer points are so arranged as to shorten drop of the material minimizing breakage; the belts may be operated at variable speeds to maintain full loads with relatively quiescent bed of material, minimizing relative particle motion; the use of a surge bin to receive material discharged from the conveyor system when the ship loader, that is, the traveling tower unit, is moving in a direction counter to the direction of normal belt flow; and provision is made for a return of the material from the surge bin back into the conveyor system. The conveyor belt extending along the pier is reversible, whereby residual material at the conclusion of loading a ship may be emptied from the entire system delivering the material on the belts to a receptacle or to railroad cars.

Briefly stated, the present invention is in the provision of an apparatus for loading a vessel at a pier with bulk material. This apparatus includes in combination guide means along the pier such as rail tracks in parallel relation to a vessel docked thereat. Movably supported on the guide is a main frame which carries a laterally projecting boom disposed in transverse relation to the pier guide or tracks. Carriage means are movably supported on the boom and are adapted to coact with material feeding and distributing means. The distributing means, which may include conventional apparatus for trimming the bulk cargo and distributing it within the body of the vessel, is manipulatable relative to the vessel; that is, it may be moved longitudinally of the vessel, horizontally transversely of the vessel, and vertically with respect to the vessel.

Bulk material is supplied to the loading apparatus by means of a conveyor disposed along and parallel with the pier guide means. These conveying means preferably include a flexible material supporting belt carried by a supporting trestle on the pier. Other conveyor means, e.g. vibratory conveyors, may be used in lieu of or in partial replacement of the belts. The distributing means is supplied with material from elevated shuttle belts movably disposed in the boom carried on the main frame. In order to elevate material from the conveying means to the shuttle belts, conveyor elevating means are provided which include a frame surmounting the conveyor supporting trestle and movable along the conveyor supporting trestle together with the main frame which in turn is movable along the guide means. The conveyor elevator frame has a lower portion adjacent the conveyor supporting trestle and movably extends beneath the conveyor belt. The upper extremity of the elevating means is disposed above a shuttle belt in the laterally projecting material conveying boom.

The pier conveyor belt is adapted to move along its supporting trestle and is so reeved through the elevator frame that it moves from the lower extremity of the elevator to the upper extremity thereof where the contents are deposited onto the shuttle belt, and then returns from the upper extremity of the elevator frame to the conveyor supporting trestle. Thus, the main frame and adjacent elevator frame may be moved together and independently of the conveyor trestle, the pier conveyor belt being threaded through the elevator means in such a manner as not to inhibit such motion of the main and elevator frames.

The invention will be more readily understood by having reference to the annexed drawings, wherein:

FIG. 1 is a perspective diagrammatic illustration of a coal loading system and showing the relative disposition of component parts thereof, and particularly the railroad car unloading means, the various conveyor belts, the elevators, and the coal loading apparatus means disposed along a pier having a pair of coal transport ships docked thereat.

FIG. 2 is a partially cut away side elevation of a bulk material loading apparatus in accordance herewith and showing the main frame movably supported on guide means, the carriage movably supported on a laterally projecting material conveying boom, the material feeding and distributing means carried by the carriage and manipulating means e.g. cables and winches for moving the distributing means relative to the vessel.

FIG. 3 is an end view of the apparatus shown in FIG. 2 showing the upper extremity of the elevator and its position relative to the boom in the main frame.

FIG. 4 is a side elevation, partially cut away, showing the conveyor elevator structure including the upper and lower extremities thereof, and its relation to the conveyor supporting trestle. Also shown is a return or recycling elevator for carrying materials stored in a hopper or surge bin in the main frame to the main conveyor belt for recirculation to the laterally projecting conveying means and ultimate deposition in the hold of a ship.

FIG. 5 is a side elevation of a forward shuttle or carriage, showing in greater detail the trolley for supporting the telescoping chute for the trimmer, the shuttle conveyor belt and the trucks for supporting the shuttle on rails carried by the boom.

FIG. 6 is a fragmentary cross-sectional view on an enlarged scale through the laterally extending boom showing upper and lower shuttles, their respective means of suspension within the boom, and the disposition of the conveyor belts.

FIGS. 7 and 8 are schematic diagrams of top and side elevations of the boom shown in dotted lines, and broken at intermediate intervals, showing the location of bumpers coacting between the respective shuttles and the frame of the boom, and the location of latching and coupling means coacting between the boom frame and between the respective upper and lower shuttles, respectively.

FIG. 9 is an elevation on enlarged scale of the coupling mechanism coacting between the upper and lower shuttles, and the latching means coacting between the boom frame and the upper shuttle.

FIG. 10 is a top elevation of the coupling mechanism shown in FIG. 9.

Figure 1:
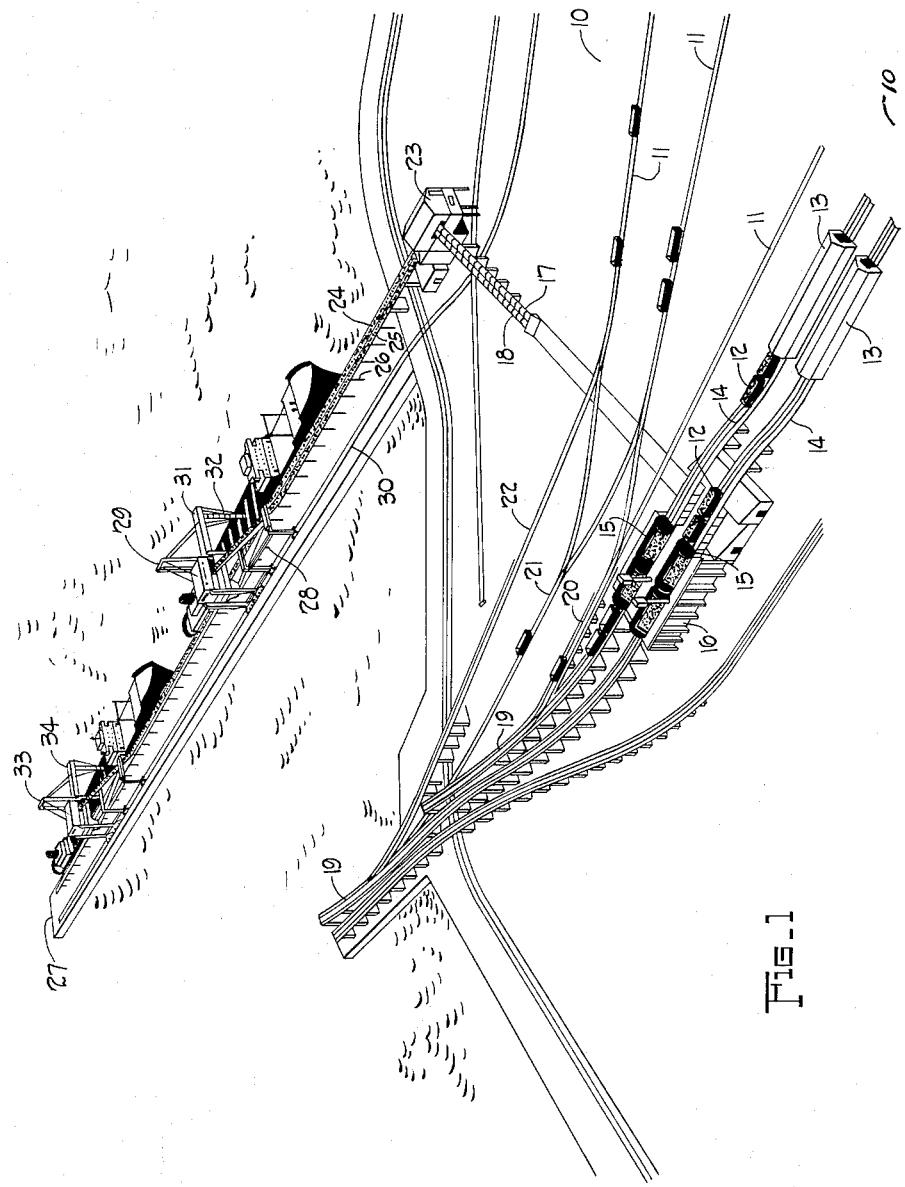

In discussing the foregoing figures individually, it will be convenient to refer to the principal components under appropriate sub headings.

*Overall system*

Referring now particularly to FIG. 1, there is here shown in diagrammatic form an illustration of a bulk material handling system in accordance with this invention. The system includes a yard 10 provided with sufficient railroad trackage 11 to permit storage and sorting of railroad cars of the gondola type. Full cars are stored in an area of yard 10 adjacent and leading to the thawsheds 13. A train of coal-containing cars, such as car 12, all containing coal of a preselected grade from the yard 10 may be made up in the usual manner and guided along suitable tracks, not shown, to one or the other or both of the thawsheds 13. During the winter season, moisture contained in the coal or other bulk material may freeze, and it is necessary to preheat the car and contents in order to permit dumping of the contents and to render the material flowable through the chutes and hoppers. Any suitable means of supplying heat to the thawsheds 13 may be employed for example, infra-red lamps. The cars are advanced through the thawsheds by any suitable means, and in accordance with the demands of a loading system, as will be hereinafter more particularly explained.

Upon leaving the thawsheds 13, the cars 12 are propelled by any suitable means, not shown, such as a barney, up an inclined track portion 14. Cars 12 then enter rotary car dumpers 15, preferably operated in tandem and in adjacent pairs as shown in FIG. 1. The contents of the car 12 are dumped into a hopper 16, and by means of shuttle belts, not shown in FIG. 1, distributed to either one of two cross-field conveyors 17 and 18, respectively. Upon re-righting, the cars are ejected from the dumper 15, and allowed to coast down an incline, past a switch, and into a reversing inclined track portion 19 for disposition along spur tracks, for example tracks 20, 21 and 22 for return to the yard 10.

Conveyor belts 17 and 18 rise from their subterranean position below the hopper 16 to an elevated position in a transfer house 23 where the bulk material is transferred to the pier belts 24 and 25 by any suitable means, not shown in FIG. 1. The contents of belts 17 and 18 are directed to belts 24 and 25, respectively, and in accordance with the requirements of the ship or ships being loaded. Belts 24 and 25 are carried on a suitable support such as trestle 26 along pier 27.

Belt 25 is threaded into elevator 28, whereby the belt contents are delivered to the shiploading apparatus generally indicated at 29. Shiploading apparatus 29 is movable along track 30 in either direction, inshore or offshore, in response to the requirements of a predetermined shiploading program. The belt contents ultimately enter the laterally projecting material conveying means 31, and are delivered to the ship's hold through telescoping chute 32.

In the illustration shown, which provides a pair of the shiploading devices hereof, the contents of conveyor belt 24 bypass the first shiploading device 29 and are handled in a similar manner by a second shiploading device 33 having laterally extending boom means 34, and telescoping chute 35.

In the system shown in FIG. 1, two vessels are being loaded. These vessels may be loaded with the same or different grade of coal, or blends of different grades may be supplied to the shiploading devices or apparatus 29 and/or 33.

As an illustration of the capacity of the apparatus, hereof, the thawing sheds 13 in a preferred embodiment are each capable of thawing cars at the rate of 60 cars per hour, and are provided with two remotely controlled pushing engines in each thawshed 13 which will move pairs of cars 12 to barneys, not shown, serving the two tandem rotary dumpers 15 of conventional design and operation. During periods of operation when thawing is not required, each pair of dumpers 15 will dump cars 12 at the rate of 126 cars per hour. Hopper structure 16 is provided with belt feeders which deposit the bulk material on 96 inch hopper conveyors which in turn deposit their load on either of the two 96 inch cross conveyors 17 or 18 which terminate in the junction house 23 at the inshore end of the pier 27. At the pier junction house 23, the bulk material is transferred to the pier belts 24 and 25 which feed the traveling shiploaders 29 and 33. The shiploaders are adapted to travel a 1600 foot long pier 27, and each is capable of loading any of the large supercarriers at a rate up to 10,000 tons per hour.

*Ship loading apparatus*

FIGS. 2, 3 and 4 show views of a preferred form of shiploading apparatus in accordance herewith. As indicated above, the pier 27 is provided with guide means, such as tracks 30. The main frame of the shiploader apparatus is composed of a front portal 40 and a rear portal 41 and beams, such as beam 42 bridging therebetween. Each of portals 40 and 41 is supported through a system of load equalizers 43 and 44, respectively, on a plurality of 4-wheel trucks 45 and 46, respectively, supported and travelling along pairs of rails 30. Locomotion is provided by cog wheels coacting with independently mounted laterally extending spaced pins or rods disposed between the rails 30 and forming a rack adapted to coact with such cog wheels. Thus, as shown in FIG. 3, front portal 40 which supports the major portion of the weight of the shiploading apparatus, is driven by a pair of cog wheels 47 and 48, respectively, coacting with a series of independently mounted pins 49 disposed between the rails 30.

Rear portal 41, which does not carry as much weight as the front portal 40, is driven by a single cog wheel 50 coacting with a plurality of independently mounted spaced pins or rods extending transversely between rear portal rails 30. Rear portal 41 is filled with concrete to counterbalance the boom loads. There may also be provided for coaction with the pins or rods 49 intermediate tracks 30 of the rear portal, safety hook means normally passing freely beneath extensions of such pins. If the load at the end of the boom becomes too great and the shiploader tends to tip, the safety hooks will be brought into engagement with the projecting free ends of the pins 49 and prevent further tipping of the apparatus. In a full scale embodiment of the present invention, each cog wheel is driven by a 50 h.p. 230 v. shunt wound D.-C. motor and held by a 600 lb./ft. A.-C. thrustor brake. The control is a full magnetic position regulated D.-C. adjustable voltage control. Power is supplied from a motor-generator set having three 85 kw. 460 v. D.-C. generators. As indicated above, the front portal (waterside) is driven by two motors and the rear portal is driven by one motor. Each portal also desirably has a separate D.-C. adjustable voltage control. The front portal control is speed regulated by a static regulator exciting the two generator fields. A permanent magnet tachometer is driven by a spring loaded idler wheel attached to the front portal which provides power speed feedback. The rear portal is controlled by a static regulator with counter E.M.F. feedback.

Skew limit control is obtained by means of small A.-C. wound rotor motors, directly connected to the drive motor on each portal and acting as differential selsyns to provide an error signal proportional to mismatch of speed and to which the regulator responds. Accuracy of the control and regulation is of the order of plus or minus about two inches between the sides measured at the rail. The motors and controls are of conventional design. At an expansion joint, of which there are several along pier 27, the laterally extending rack pins or rods on either side of the joint are of smaller diameter, e.g. 3″ instead of the 4″ diameter normal for such pins. The change in pin diameter provides play sufficient to account for expansion or contraction of the pier.

The main frame as shown in FIGS. 2–4, and particularly in FIG. 2 stradles conveyors 24 and 25 which are, in turn, supported by trestle 2. Conveyor belt 24 feeds the shiploading apparatus shown in FIGS. 2–4. The main frame also supports a hopper or surge bin 52 which has a capacity sufficient to store an amount of bulk material equivalent to that carried by the full length of pier conveyor belt 24. Bulk material stored in bin 52 may be recycled to main belt 24 by means of a recycle belt 53 carried by recycle belt frame 54 and adapted to coact with shuttle belts 55 and 56 in a manner hereinafter more fully explained.

Pier conveyor belt 24, as indicated above, enters conveyor elevating means generally indicated at 57 including a frame 58 supported on an offshore portal 59 and an inshore portal 60. Portals 59 and 60 are in turn mounted on wheeled trucks 61 and 62, respectively which are guided by track 30 along the pier. Portals 59 and 60 are joined together by suitable beams such as beam 63 to form a support for conveyor elevating means 57 and recycle conveyor frame 54. The elevators 54 and 57 in combination with the portals 59 and 60 constitute what is conveniently called a trailer which is tied to the main frame of the shiploading apparatus as by tie rod 64 so as to move as a unit therewith.

Conveyor belt 24 is threaded through the elevator frame 58 which is set at an inclined angle with respect to the normal plane of the conveyor belt 24 entering at the lower extremity 65 and passing over a pulley 66 at the upper extremity 67 where its direction is reversed, thus forming a point from which the belt burden may be discharged or cascaded onto another belt. Conveyor belt 24 is then supported by support rollers 68 at conveniently spaced intervals along the elevator frame 58, and retraces its course through the frame 58 to a position adjacent the lower extremity 65. At this point, the belt 24 passes over pulley 69 supported slightly above the trestle 26 whereupon the belt 24 is returned to its normal course along trestle 26. As indicated above, trestle 26 and the belt supporting means carried thereby is coextensive in length with the pier 27 and is conveniently affixed to the pier 27. At the offshore extremity of the trestle, a reverse pulley, not shown, is provided to return the belt to the junction house 23 (FIG. 1).

It will thus be seen that the shiploader assembly and trailer shown best in FIG. 4 may be moved in either direction along the track 30 independently of the conveyor belt 24 because of the manner in which the belt 24 is threaded through the conveyor elevator means 27.

*Laterally projecting material conveying boom*

As indicated above, the shiploading apparatus 29 is provided with boom 31 (FIG. 1). As shown in FIG. 2, the boom 31 is supported by the main frame composed of front and rear portals 40 and 41, and cross beam members such as beam 42, and includes a pair of shuttle conveyor belts, suitably supported therein, both of which are movable within the boom framework generally indicated at 31. The shuttle belts are disposed one above the other. For convenience, the lower belt, and the one which is extensible with its shuttle to the end of the boom, will be identified as the apron or shuttle belt 75. The upper conveyor belt will, for convenience, be identified as shuttle belt 76.

Shuttle belt 76 is positioned within the boom 31 so as to receive the discharge from the upper extremity 67 of the elevator 57 of bulk material carried by belt 24. Shuttle belt 76 may be operated in either direction, and when operated for loading a ship, shuttle belt 76 conveys such bulk material from right to its left hand extremity as shown in FIG. 2 where it is discharged to apron belt 75. Apron belt 75 also operates in either direction and normally discharges the material received from shuttle belt 76 into telescoping chute 78 for delivery to trimmer 79. Trimmer 79 is a structure which is known to the art, and example of suitable devices are more completely described and claimed in Patent No. 2,857,041 dated October 21, 1958, and Patent No. 2,988,201, dated June 13, 1961.

Telescoping chute 78 and trimmer 79 form a unitary structure which is suspended from trolley 80 which, in turn, is carried by trucks 81 and 82 for movement along rails (not shown in FIG. 2) supported by boom 31. Chute 78 is pivoted at trunnion 83 carried by trolley 80 for movement preferably in a vertical plane normal to the pier 27 for disposition in various positions such as those shown in dotted lines in FIG. 2. Means may be provided, if desired to provide for movement of the chute in a plane parallel to the pier.

Operator's cab 84 is also suspended from trolley 80 for movement along boom 31 with chute 78, and trimmer 79, and shuttle belt 75. Trimmer controls are carried by operator cab 84 and desirably provided with interconnected remote console controls for use by a deck foreman who, from his deck position, can easily view the loading operation and thus better control the trimming operation. The position of cab 84 is selected so that the operator is provided with the best vantage point from which to view the operation of the shiploading apparatus.

As indicated above, apron belt 75 and shuttle belt 76 are movable within the boom 31. In order to facilitate such movement, belt 75 is disposed in a carriage 85, which carriage is in turn supported by a forward truck 82 and rear carriage truck 87 for simultaneous movement with telescoping chute 78 and trimmer 79. Carriage 85 may be retracted in the boom 31 to a position shown in dotted lines and also indicated by the numeral 85.

Upper shuttle belt 76 is conveniently supported in a slightly different manner, although any suitable support means may be used which will permit axial movement of the shuttle belt 76 in carriage 86. In the preferred embodiment, carriage 86 is provided with suitable side rails integrally attached thereto adapted to ride on wheels or rollers mounted on the side walls of boom 31. In the fully retracted or "parked" position, carriage or upper shuttle 86 occupies a position shown in dotted lines and indicated by the numeral 85.

Boom 31 comprises two sections. Rear boom section 88 is integral with the main frame which includes front portal 40 and rear portal 41. Front boom section 89 is pivotally connected to rear boom section 88 by means of pivot 90, and is adapted to be suspended by a series of pivotally interconnected eyebars 91 in a horizontal position, to provide a continuation of rear boom section 88. This structure provides an elongated flexible linkage of substantially constant length having one free end pivotally secured to the front boom section, or apron 89, by means of bracket 92, and the remaining free end thereof pivotally secured to bracket 93 located at the distal extremity of mast 94 which is in turn carried by front portal 40. The raised position of apron 89 is shown in dotted lines. Mast 94 also carries at its upper extremity a latch 95 which coacts with latch engaging member 96 secured to the apron 89 near the outer extremity. By a suitable system of cables 97, apron sheaves 98 and mast sheaves 99 coacting with apron winch 100, apron 89 may be raised to the position shown in dotted lines in FIG. 2 to permit passage of a ship's super-structure during docking and undocking.

Movement of the carriages 86 and 85 and the trolley 80, from which the telescoping chute 78 is suspended, is effected by cables and winches carried in an engine house 102 which in turn is carried by the main frame.

When the shiploading apparatus is in the operation position such as shown in FIG. 2, bulk material is carried by the pier belt 24 and discharged at the upper extremity of the elevator, and permitted to cascade on to shuttle belt 76 which moves the material from right to left, as shown in FIG. 2 and in turn cascades the bulk material on to apron belt 75. From apron belt 75, the bulk material is cascaded into telescoping chute 78 where it is delivered to the trimmer 79 for distribution in the ship's hold.

When the shiploading apparatus as shown in FIG. 2 is to be moved inshore, shuttle belt 76 is reversed. Even though the application of driving force to belt 24 may be stopped during inshore traverse by the shiploading apparatus, there is, nevertheless, relative movement of belt 24 with respect to the apparatus shown in FIG. 2 and hence bulk material continues to be cascaded onto belt 76. Belt 76, which is now operating in the reverse direction, cascades the bulk material into hopper 52 for storage therein. Hopper 52 has a capacity which is sufficient to contain a full pier belt charge; that is, an amount of bulk material equivalent to that required to fill the belt 24 to capacity from the inshore extremity at the junction house 23 to the offshore extremity at the end of pier 27.

Referring now to FIG. 4, when it is desired to move the shiploading apparatus in an offshore direction, feeder belt 55 is actuated for delivering the contents of hopper 52 to elevator or recycle belt 53. The contents of recycle belt 53 are cascaded through discharge spout 103 on to transverse belt 56, and from transverse belt 56 to main conveyor belt 24. As the apparatus moves in an offshore direction, even though the driving mechanism for 24 is stationary, there is an apparent movement of belt 24 in a reverse direction with respect to the apparatus, and the effect of recycling the hopper 52 contents to belt 24 in the manner above described is to reload belt 24 for a distance equivalent to the change in pier position of the apparatus.

In the specific example illustrated and when coal is the bulk material being handled, hopper 52 will have a capacity of about 400 tons. Shuttle belt 76 and apron belt 75 have a width which is the same as the width of pier belt 24, e.g., 96 inches, and are conveniently, conventional endless belts carried on a driving pulley at one end and a reversing pulley at the other end, and supported at appropriate intervals along both the conveying and return portions by idler rollers. The upper rollers are preferably so constructed and disposed to form a trough in the belt to aid in confining bulk material carried thereby. All belts may be reversed in direction, if desired.

Referring now more particularly to FIG. 5, there is here shown in greater detail, the trolley 80, and pivot or trunnion 83 from which the telescoping chute 78 is suspended. Trolley 80 is provided at its opposite ends with trucks 81 and 82 adapted to run on guide rails 110 (FIG. 10) supported by the boom means generally indicated at 31. Rails 110 are coextensive in length with the boom 31 so that the shuttle 85 and trolley 80, which is affixed thereto, may be retracted or extended along the full length of the boom 31. The apron portion 89 is, as indicated in FIG. 2, pivoted to the fixed portion 88, and accordingly guide rails 110 are severed at an appropriate point to permit raising of the apron 89 to the position shown in dotted lines in FIG. 2. The location of the rails with respect to the pivot point 90 is such that when the apron 89 is in the horizontal position, rails 110 are continuous from portion 89 to portion 88 of the boom 31. The juncture of the severed rails is desirably treated in such a way as to minimize wear of the abutting rail ends. Conventional overlap of either the over-under, or side-by-side types may be used.

Suitable belt drive means 111 are provided and mounted for coaction with drive pulley 112 for operating belt 75. Reversing pulley 113 supported by the shuttle 85 is provided for returning the belt in the normal manner for such conveyor belts. Support rollers 114 and angularly disposed idlers 115 are provided for supporting a loaded belt and giving it a contour such as shown best in FIG. 10. Return rollers 116, disposed at wider intervals than the support rollers 114 and 115, serve to support the belt during return for reloading.

Upper shuttle 86 also comprises a framework or carriage adapted to carry a conveyor belt 76 on idler rollers 115 and support rollers 114 for the loaded portion of belt 76, and return rollers 116 for the unloaded belt portion. The construction of the respective shuttle portions 85 and 86 is substantially the same, and no purpose will be served by reproducing a diagram showing the upper shuttle 86 in the detail shown in FIGURE 5 for shuttle 85. While the mode of suspension of the respective shuttles is different, this difference in the preferred embodiment is clearly shown in FIG. 6. Lower shuttle 85 is supported on trucks 82 for movement along rails 110 affixed to the boom 31. Shuttle 86 is suspended in the reverse manner, the guide rails 117 being affixed to the carriage 86, and the rolling wheels 118 being secured for rotation to the sides of the boom frame 31. As shown in FIG. 2, wheels 118 are provided at suitably spaced intervals along both the stationary portion 88, and along the apron portion 89 so that the shuttle 86 is supported throughout the extent of its travel therein. It can thus be seen, that when both the upper shuttle 86 and the lower shuttle 85 are in the fully retracted position, as shown in dotted lines in FIG. 2, the apron portion 89 may be pulled by means of cable 97 into the raised position shown in dotted lines in FIG. 2 to permit the passage of the super-structure of vessels approaching alongside pier 27.

Shuttle control and coupling

FIGS. 7 and 8 show in diagrammatic form the location of various stops and latching mechanisms which coact between the respective shuttles and the boom framework upon which the shuttles ride, or between the respective shuttles for the purpose of controlling the travel of the shuttles with respect to each other and with respect to the boom 31.

There are shown in FIGS. 7 and 8, instrumentalities disposed on opposite sides of the conveyor belt shown in dotted lines in FIG. 7, as follows: Mounted on lower shuttle 85 there is provided a lower shuttle spring and coupler assembly 120 and an upper shuttle-latch release cam 121. The lower shuttle at its inboard extremity is provided with a spring bumper assembly 122 affixed to the lower shuttle 85, and adapted to abut against a stop carried by the stationary frame portion 88, not shown in FIGS. 7 and 8 for limiting the inboard travel of the lower shuttle 85.

To determine the extent of inboard travel of the upper shuttle 86, there is provided a bumper assembly 123 which is secured to the boom portion 88, and is adapted to intercept inboard spring bumper assembly 124 mounted on the upper shuttle 86.

In order to secure the upper shuttle 86 in the "parked" or fully inboard position, there is provided latch means conveniently composed of an upper shuttle latch hook assembly 125 adapted to coact with a latch bracket 126 mounted on the boom portion 88. Thus, when the upper shuttle 86 is in the inboard or parked position, spring bumper assemblies 124 coacting with bumpers 123 on opposite sides of the shuttle restrain motion in a direction proceeding from left to right as shown in FIG. 7, and latch means 125 and 126 coact to prevent motion in a direction from right to left. Thus the upper shuttle 86 is secured in the parked position.

The extent of travel of the upper shuttle 86 is limited so that the conveyor belt 76 is at all times during the coal or bulk material feeding operation disposed in a position to receive bulk material from pier conveyor belt 24 (FIG. 2). At the same time, the outboard extremity of the upper shuttle conveyor belt 76 must, at all times during loading operations, be disposed in overhanging relation with respect to apron conveyor belt 75.

To insure the proper relationship between upper conveyor belt 76 and lower conveyor belt 75 during loading, coupling means including an upper shuttle coupler hook assembly 127 is secured to the undersurface of the upper shuttle and is positioned for operative coaction with the lower shuttle spring coupler assembly 120. As will be hereinafter more fully explained when the lower shuttle 85 moves in an outboard direction a predetermined distance, the lower shuttle spring coupler assembly 120 engages the coupler hook assembly 127 effectively locking the upper and lower shuttles 85 and 86 together so that from the coupled position in outboard direction, upper shuttle 86 moves as a unit with lower shuttle 85. In order to uncouple shuttles 85 and 86, a coupler release cam 128 is positioned in the boom 31 to effect disengagement of the coupler hook 127 from the spring and coupler assembly 120 to permit further inboard retraction of lower shuttle 85 to the parked position as shown in dotted lines in FIG. 2.

*Shuttle coupler and latch*

FIGS. 9 and 10 show in greater detail the lower shuttle spring and coupler assembly 120, the upper shuttle-latch release bracket 126, the coupler hook assembly 127 and the coupler release cam 128. These parts are shown using the same numbers as in FIGS. 7 and 8 and generally indicating the corresponding parts by arrows.

As shown in FIGS. 9 and 10, lower shuttle spring and coupler assembly 120 is composed of spring housing 130 containing spring 131 biased between the housing 130 and coupler arm 132, the outer extremity of which is provided with laterally extending coupler bar 133. Housing 130 is mounted on a suitable bracket 134 which is in turn secured to the lower shuttle carriage 85.

Interlocking engagement with the upper shuttle 86 is effected through the coupler hook assembly generally indicated at 127 which is composed of a coupler arm straddling coupler hook 135 mounted for limited rotation on pin 136 carried in one end of anvil 137, which is in turn suspended from shuttle 86 by means of bracket 138.

Compression spring 139 is biased between the bracket 138 and coupler hook 135 with the aid of suitable mounting brackets 140 and 141. The effect of compression spring 139 is to urge coupler hook downward in a locking position as shown in FIG. 9. In operation, then, when the relative motion of upper shuttle 86 and lower shuttle 85 is such that the anvil 137 is approaching the coupler arm 132, the inclined leading edges 142 of coupler hook 135 engage rollers 136a causing elevation of hook 135 in opposition to spring 139 and overriding of rollers 136a to permit locking of the rollers 136a within the hook portion 143 as shown in FIG. 9.

In the coupled position as shown in FIG. 9, lateral movement of lower shuttle 85 effects a corresponding movement of upper shuttle 86.

Pin 136 is integrally secured or keyed to one extremity of lever arm 144 which, in turn, carries at its extremities cam follower 145 positioned for operative coaction with coupler release cam 128 which is secured to the portion 88 of boom 31. Thus, when upper shuttle 86 is moving in a direction from left to right as shown in FIG. 9, engagement of cam follower 145 with cam release 128 causes hook 135 to be raised against the force of compression spring 139 and effects disengagement of coupler hook assembly 127 from lower shuttle coupler assembly 120 thus allowing the shuttles 85 and 86 to move independently of one another.

Latch hook assembly 125 and latch bracket 126 are secured respectively to upper shuttle 86 and the boom 31, and coact to provide an inboard or parked, stopped and locked position for upper shuttle 86. The latch hook assembly 125 serves to hold the upper shuttle in position while coupling of the upper shuttle 86 to the lower shuttle 85 is being effected. Release of the latch 125 restraining axial movement of upper shuttle 86 is effected by cam 121 mounted on lower shuttle 85.

Accordingly, latch hook assembly 125 is mounted for movement with upper shuttle 86. It is composed of a hook member 150 mounted for a limited rotation about pin 151 carried by bracket 152 which is in turn secured to upper shuttle 86. Latch hook 150 is urged downward by compression spring 152 coacting between hook 150 and bracket 152, being secured respectively thereto by suitable spring brackets 153 and 154. Mounted for angular rotation with latch hook 150 is lever arm 155 having roller cam follower 156 mounted for rotation at the distal extremity thereof. Cam follower 156 is positioned for operative coaction with cam 121 which, as indicated above, will effect a release of the hook 150 against the effective forces of spring 152, thereby permitting upper shuttle 86 to move.

As indicated above, hook 150 is adapted to coact with a latch bracket 126 which is secured to the boom 31. Latch bracket 126 includes a detent 157 mounted on a bracket 158 which is in turn slideably mounted along cylinder 159 having arm 160 extending in the interior of of spring cylinder 159. Arm 160 is biased against spring 161 which absorbs the shock of impact of the latch hook 150.

Assuming that shuttles 86 and 85 are in the parked position, upper shuttle 86 is retained in its position by the combined effect of inboard spring bumper assembly 124 and bumper 123, and latch 150 coacting with latch bracket 157. Lower shuttle is uncoupled from upper shuttle 86, and the cam follower 121 at its extreme right hand position as shown in FIGS. 7 and 8. As lower shuttle 85 is moved by means of cable 162 (FIG. 2) in an outboard direction, inclined face 142 of hook 135 first contacts rollers 136a on the outer extremity of coupler arm 132. The shock of impact is absorbed by spring 131. Roller 136a soon escapes into hook portion 143, and shuttle 85 is coupled to shuttle 86. During this coupling operation, latch 150 has been in locked engagement with latch keeper 157 thereby preventing lateral movement of upper shuttle 86. Immediately upon coupling of shuttles 85 and 86, cam 121 contacts cam follower roller 156 effecting a release of latch 150 from the keeper 157, and the coupled shuttles 85 and 86 may then be moved by means of cable 165 to any desired position along the boom 31.

In the outboard position, loading of the bulk material is effected in the manner previously described.

To retract the upper and lower shuttles to the parked position, the reverse sequence of operations is followed. However, as the coupled shuttles 85 and 86 move back toward the parked position, cam follower 145 first comes into contact with cam 128 to effect a release of hook 135 from coupling position with coupler 132. This operation is effective just prior to locking engagement of latch 150 with latch keeper 157. The position of the inhaul and outhaul cables 165 and 165a then determines the final position of lower shuttle 85, which, as indicated above, may be fully retracted to the position shown in dotted lines in FIG. 2.

*Bulk material loading operation*

The individual conveyor drive means are conveniently adjustable voltage drives regulated by a conventional tachometer feedback signal from the preceding conveyor. This provides the operator with a metered feed control, directly proportional to belt speed. This ship loader operator sets the prime reference for the feed rate he desires by means of a stepless master switch located on his control panel. The lead unit for the system is the apron conveyor belt 75. However, for design reasons it is not apron conveyor 75 that determines the system response rate, but rather the much longer pier conveyor 24 (or 25). Practical design rates of acceleration and deceleration for the pier conveyor belts are slower than the corresponding rates for the apron conveyor 75 and the shuttle conveyor 76 which pier conveyor 24 feeds. In order to accomplish a continuous ribbon feed of material of consistent cross section to the delivery point, it is necessary to set the acceleration and deceleration of front apron conveyor 75 to the design rate established for pier conveyor 24. The reference feedback signal from the tachometer coacting with shuttle conveyor 76 then controls pier conveyor 24 within its design limits.

The loading apparatus is designed to operate as an automatic system maintaining bulk material level in the telescoping chute hopper to minimize degradation when running prepared coal, or as a manual system when running slack coal. The feed rate for both systems is under direct control of the shiploader operator.

For automatic operation, the shiploader operator may select "automatic" on the selector switch in the shiploader operator's cab. A feed rate master control then regulates the speed of apron conveyor 75, and the remainder of the system follows pursuant to the system of feedback tachometers as indicated above. As disclosed in the aforementioned prior patents, the telescoping chute 78 is provided with a chute gate at the bottom thereof. In automatic operation, the gate at the bottom chute 78 is kept closed until bulk material fills up the chute, and control means operating in synchronism with the pre-set feed rate opens the chute gate an amount equal to the pre-set feed rate. The speed of the apron conveyor 75 remains constant at the pre-set feed rate and level is maintained in the chute hopper by the automatic level control varying the gate opening when surges or voids of bulk material occur.

For manual operation, the operator selects "manual" on the selector switch in the shiploader operator's cab. In manual operation, the chute gate is kept open at all times, and at the operator's discretion, the trimmer 79 may be swung away vertically to allow free flow of bulk material. The feed rate master switch has a range of from 1,000 to 10,000 tons per hour and, as indicated above, determines the speed of the apron conveyor 75, and the balance of the system follows. In the range of from 1,000 to 8,000 tons per hour, in a preferred embodiment, the material cross-sectional area on the belt is maintained constant and the conveyor speed is varied. In the upper range of 8,000 to 10,000 tons per hour, the conveyor speed is maintained constant at about 900 feet per minute, and the cross-sectional area of the bulk material is varied. The increase in material cross-sectional area may be accomplished by increasing the speed of the dumper hopper feeders dispensing material from hopper 16 (FIG. 1). A tachometer generator on the main hopper conveyor, operating with the feeders in hopper 16, not shown in the drawings, sends a reference signal to the hoppers through a fixed resistance which decreases the reference signal a predetermined amount. Thus when the main hopper conveyor (hopper 16) is running at maximum speed, the reference to the hopper feeders, which are small feeders cascading the material from individual hopper bins onto the main hopper conveyor, is overridden by this resistance value. When increasing to the 10,000 tons per hour rate, a contact on the feed rate master switch shorts out the resistance in the reference signal and switches in a variable resistance on the master switch, thus making the reference signal variable without increasing the speed of the main hopper conveyor.

Individual conveyors in the system may be operated individually by selecting "local" operation at the local push button station. If a conveyor push button is inadvertently left in the "local" position, the entire line cannot be started from the shiploader. The inability of the system to start is indicated by the absence of a "ready-to-start" light in the shiploader operator's cab. If a local operation selection is made, the conveyor may be operated at a preset fixed forward speed only by depressing the "test" push button located at the local push button station.

With all local forces returning to the "panel" position, the conveyors are ready to start and the condition is indicated by a "ready-to-start" light in the shiploader operator's cab.

The main pier conveyors 24 and 25 may be operated at a minimum fixed reverse speed when a "local" selection has been made at local push button station in the junction house 23, thus providing a means of loading to hopper cars 12 any material remaining on pier belts 24 or 25 or in the surge bin 52 after a particular cargo loading. The field conveyor or conveyors 18 and 17 may be operated from the junction house 23 at a fixed forward speed, with the main hopper conveyor and the hopper feeders following to transfer material to the reversely running pier conveyors and then through the hoppers in junction house 23 into cars 12 to completely clean out the system.

If any conveyor is stopped by means of a "stop" push button, cable limit switch, belt training limit switch, or a dropping out of an under-voltage relay, the entire conveyor system comes to a controlled deceleration stop. When the stopped conveyor is "reset," the conveyors are again ready to start as indicated by a "ready-to-start" light in the shiploader operator's cab.

The basic feed control of the six hopper feeders associated with the main hopper conveyor coacting with hopper 16, is set by the reference tachometer on the main hopper conveyor which feeds belts 17 and 18. As explained, this reference is overridden when the higher tonnage rate is desired. Another consideration, which necessitates overriding the signal from main hopper conveyor, is the desire to maintain a head of material above each of the six hopper feeders to reduce particle impact. Impact of coal tumbling upon coal for example affects the particle size which, in some cases, must be maintained within a certain range. Because incoming cars may be of random lengths, it is a distinct possibility that short cars may be in sequence on a particular dumper, thus reducing the amount of material dumped into the hopper 16. In this case, a low level sensing device in the underloaded hopper cuts out the feeder and adjusts upward the reference to the remaining five feeders so that the total feed rate to the main hopper conveyor remains constant. Should an extreme condition occur, whereby both end hoppers would be unfilled and the low level device cuts off the hopper feeders at each end, the rates of the middle hopper feeders would be sufficiently scaled up to maintain the feed rate.

Field belts 17 and 18 are also conveniently provided with belt scales to give a tonnage indication to the hopper 16 under the dumper and thus control to some extent the feed rate to the field belts 17 and 18. The operator may, in order to account for variations in actual weight due to moisture, for example, override the belt scale control to maintain desired actual weight delivery rate. Metal detectors may also be provided for field belts 17 and 18 to cause stoppage of the belt carrying any unwanted metal at a point when it can be removed conveniently, e.g. where the field belts emerge from underground (FIG. 1).

When the operator desires to travel inshore with the pier conveyor in a loaded condition, he needs only to reduce the feed rate of the pier conveyors 24 and 25 to zero with the feed rate master switch, and then pass through the zero position to a single point beyond. A contact on the master switch reverses shuttle conveyor 76 and sets its speed to a fixed minimum setting. Shuttle conveyor 76 then transports the material transferred from pier conveyor 24 into the storage hopper 52 while the shiploading apparatus is traveling into the loaded belt 24 or 25. The foregoing is, of course, arranged through a permissive interlock which must be satisfied before shiploader travel into the belt is possible. Apron conveyor 75 stops unless it is in position over the hopper 52, in which case it reverses in the same manner as shuttle conveyor 76 and deposits its contents into the storage hopper 52. The storage hopper 52 is capable of holding all the material accumulated when traversing the shiploader the length of the pier.

When shiploading is resumed, level devices in the storage bin 52 automatically start the recycle system. This system is comprised of a variable rate belt feeder and two constant speed conveyors which deposit material accumulated in the storage hopper 52 back onto the main conveyor 24. In order that the material cross section on conveyor 24 may not be unduly increased on the cycle system, a proportional type of control is supplied to the variable rate feeder to prevent the recycled load from exceeding 7½% of the load on pier conveyor 24. This is accomplished by controlling the feeder rate proportionally to the main stream belt speed. Should the shiploader operator be calling for a feed rate in excess of 8,000 tons per hour, the range where the cross-section is increased by increasing feeder speed relative to the main stream conveyors 24 and 25, a contact on the speed rate master switch limits the recycle speed to a preset fixed rate of approximately 150 tons per hour.

This novel recycle facility may seem insignificant in comparison to the magnitude of the overall system of equipment, yet the flexibility it provides enables the operator to follow a varied loading sequence required by each vessel without leaving sections of the conveyor unloaded when inshore travel is required or when offshore travel is required. Studies indicate that vessel loading time may be reduced by as much as 20% by following this method of loading rather than the usual traveling shiploader practice.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. An apparatus for loading a vessel at a pier with bulk material comprising in combination:
   (a) guide means disposed along the pier for parallel relation to a vessel docked thereat,
   (b) a main frame movably supported on said guide means,
   (c) a boom structure comprising a front boom portion and a rear boom portion and carried by said main frame and disposed transverse to said pier guide means, said front boom portion extending beyond said main frame and pivotally secured to said rear boom portion.
   (d) pivot means coacting between said rear boom portion and the adjacent extremity of said front boom portion for rotatably securing said front boom portion thereto,
   (e) a plurality of shuttles movably supported on said boom in surmounting parallel relation to each other, said shuttles being retractable from said front boom into said rear boom portion,
   (f) means for retracting said shuttles into said boom portion,
   (g) material conveying means carried by each of said shuttles,
   (h) material distributing means coacting with one of said shuttles for delivering bulk material to said vessel, and
   (i) means coacting with the frame, the shuttles and the distributing means to selectively manipulate said distributing means relative to the vessel.

2. An apparatus for loading a vessel at a pier with bulk material comprising in combination:
   (a) guide means disposed along the pier for parallel relation to a vessel docked thereat,
   (b) a main frame movably supported on said guide means,
   (c) a boom structure comprising a front boom portion and a rear boom portion and carried by said main frame and disposed transverse to said pier guide means, said front boom portion extending beyond said main frame and pivotally secured to said rear boom portion,
   (d) pivot means coacting between said rear boom portion and the adjacent extremity of said front boom portion for rotatably securing said front boom portion thereto,
   (e) a plurality of shuttles movably supported on said boom in surmounting parallel relation to each other said shuttles being retractable from said front boom portion into said rear boom portion,
   (f) means for retracting said shuttles into said rear boom portion,
   (g) material conveying means carried by each of said shuttles,
   (h) material distributing means coacting with one of said shuttles for delivering bulk material to said vessel,
   (i) means coacting with the frame, the shuttles and the distributing means to selectively manipulate said distributing means relative to the vessel,
   (j) continuous bulk material conveying means disposed along said pier and parallel with said pier guide means,
   (k) said pier conveying means including a flexible material supporting belt carried on a trestle,
   (l) elevating means coacting with said belt including a frame independently surmounting said trestle and movable therealong together with said main frame, said elevator means having a lower portion movably extending beneath said pier conveying belt, and an upper extremity adapted to effect a discharge of material carried by said belt onto the material conveying means in the uppermost of said shuttles,
   (m) means for moving said pier conveyor belt along its supporting trestle and along said elevator means from the lower extremity to the upper discharge extremity, and
   (n) means coacting between said elevator means and the belt supporting trestle to return the conveyor belt from the point of discharge to the conveyor belt supporting trestle.

3. An apparatus for loading a vessel at a pier with bulk material comprising in combination:
   (a) guide means disposed along the pier for parallel relation to a vessel docked thereat,
   (b) a main frame movably supported on said guide means,
   (c) a boom carried by said main frame and disposed transverse to said pier guide means,
   (d) a plurality of shuttles movably supported on said boom is surmounting parallel relation to each other,
   (e) material conveying means carried by each of said shuttles,
   (f) material distributing means coacting with one of said shuttles for delivering bulk material to said vessel,
   (g) means coacting with the frame, the shuttles and the distributing means to selectively manipulate said distributing means relative to the vessel,
   (h) continuous bulk material conveying means disposed along said pier and parallel with said pier guide means,
   (i) said pier conveying means including a flexible material supporting belt carried on a trestle,
   (j) elevating means coacting with said belt including a frame independently surmounting said trestle and movable therealong together with said main frame, said elevator means having a lower portion movably extending beneath said pier conveying belt, and an upper extremity adapted to effect a discharge of material carried by said belt onto the material conveying means in the uppermost of said shuttles,
   (k) means for moving said pier conveyor belt along its supporting trestle and along said elevator means from the lower extremity to the upper discharged extremity,
   (l) means coacting between said elevator means and the belt supporting trestle to return the conveyor belt from the point of discharge to the conveyor belt supporting trestle,
   (m) hopper means carried by said main frame,
   (n) means for recycling bulk material from said hopper to said pier conveyor belt, and
   (o) means for selectively discharging bulk material from said pier conveyor belt into said hopper.

4. An apparatus in accordance with claim 3 in which the means (o) for selectively discharging bulk material from the pier conveyor into the hopper includes:
   (p) means for positioning the upper shuttle including its material conveying means in position to discharge material received from said pier conveyor into said hopper when said shuttle conveying means is reversed, and
   (q) means for reversing the direction of said upper shuttle conveyor means.

5. An apparatus for loading a vessel at a pier with bulk material comprising in combination:
   (a) guide means disposed along the pier for parallel relation to a vessel docked thereat,
   (b) a main frame movably supported on said guide means,
   (c) laterally projecting material conveyor support means carried by said main frame and disposed transverse to said pier guide means, said support means having a rear portion, and a front portion extending therefrom,
   (d) pivot means coacting between said rear portion and the adjacent extremity of said front portion for rotatably securing said front portion to said rear portion,
   (e) an upper shuttle including material conveying means and movably supported in said laterally projecting means in surmounting parallel relation to
   (f) a lower shuttle including material conveying means and also movably supported in said laterally projecting means, said shuttles being retractable from said front portion into said rear portion of said support means,
   (g) means for retracting said shuttles into said rear portion,
   (h) latch means releasably coacting between the laterally projecting means and the upper shuttle to hold the upper shuttle in fixed position relative to the laterally projecting means, and
   (i) coupling means releasably coacting between adjacent extremities of the shuttle members to selectively couple them together for integrated movement in overriding relation with respect to said latch means and in response to extension of the lower shuttle relative to the upper shuttle.

6. An apparatus in accordance with claim 5 in which the laterally projecting means (c) comprises
   (j) an inboard portion, and
   (k) an apron portion pivoted to said inboard portion for rotation in a plane normal to the pier, and
   (l) means for raising said apron portion out of the path of superstructure on said vessel during docking and undocking.

7. In an apparatus for loading a vessel at a pier with bulk material having a main pier conveyor belt, a main frame, elevated laterally projecting material conveying means carried by said main frame, and means for elevating said pier belt for discharge of bulk material to said laterally projecting conveying means for delivery to said vessel, said main frame and said elevating means being movable along said pier independently of said pier conveyor belt, the improvement which comprises:
   (a) a hopper carried by said main frame
   (b) means for reversing the normal direction of material flow on said laterally projecting conveying means to cascade material received from said main pier belt into said hopper, and
   (c) recycle conveyor means coacting with said hopper and said pier belt to recycle material from said hopper to said pier belt, whereby, when said main frame and said elevator means is moved in a direction toward the source of bulk material and the main conveyor belt is stopped, the bulk material carried by that portion of the belt traversed by movement of said main frame and elevator, is delivered to said hopper for storage until loading is begun again.

8. In an apparatus for loading a vessel at a pier with bulk material having a main pier conveyor belt, a main frame, elevated laterally projecting material conveying means carried by said main frame and means for elevating said pier belt for discharge of bulk material to said laterally projecting material conveying means, means for delivery of bulk material from said laterally projecting conveying means to said vessel, said main frame and elevating means being movable along said pier independently of said pier conveyor belt, the improvement which comprises:
   (a) a hopper carried by said main frame,
   (b) means for moving said conveying means to a position above said hopper,
   (c) means for reversing the conveying means to cascade the material received thereby into said hopper, and
   (d) recycle conveyor means coacting with said hopper to said pier belt to recycle material from said hopper to said pier belt, whereby, when said main frame and said elevator means is moved in a direction toward the source of bulk material and the main conveyor belt is stopped, the bulk material carried by that portion of the belt traversed by movement of said main frame and elevator, is delivered to said hopper for storage until loading is begun again.

9. In an apparatus for loading a vessel at a pier with bulk material having a main pier conveyor belt, a main frame, elevated laterally projecting material conveying means carried by said main frame, and means for elevating said pier belt for discharge of bulk material to said laterally projecting conveying means for delivery to said vessel, said main frame and said elevating means being movable along said pier independently of said pier conveyor belt, the improvement which comprises:

(a) a hopper carried by said main frame,
(b) means for reversing the normal direction of material flow on said laterally projecting conveying means to cascade material received from said main pier belt into said hopper, and
(c) recycle conveyor means coacting with said hopper and said pier belt to recycle material from said hopper to said pier belt, whereby, when said main frame and said elevator means is moved in a direction toward the source of bulk material, the bulk material carried by that portion of the belt traversed by movement of said main frame and elevator, is delivered to said hopper for storage until loading is begun again.

10. In an apparatus for loading a vessel at a pier with bulk material having a main pier conveyor belt, a main frame, elevated laterally projecting material conveying means carried by said main frame and means for elevating said pier belt for discharge of bulk material to said laterally projecting material conveying means, means for delivery of bulk material from said laterally projecting conveying means to said vessel, said main frame and elevating means being movable along said pier independently of said pier conveyor belt, the improvement which comprises:

(a) a hopper carried by said main frame,
(b) means for moving said conveying means to a position above said hopper,
(c) means for reversing the conveying means to cascade the material received thereby into said hopper, and
(d) recycle conveyor means coacting with said hopper to said pier belt to recycle material from said hopper to said pier belt, whereby, when said main frame and said elevator means is moved in a direction toward the source of bulk material, the bulk material carried by that portion of the belt traversed by movement of said main frame and elevator, is delivered to said hopper for storage until loading is begun again.

11. In an apparatus having a pair of material conveying shuttle members disposed in surmounting parallel relation on a supporting frame:

(a) latch means releasably coacting between the frame and the upper shuttle to hold the upper shuttle in fixed position relative to the frame;
(b) coupling means releasably coacting between adjacent extremities of the shuttle members to selectively couple them together for integrated movement in response to extension of the lower shuttle relative to the upper shuttle, said upper shuttle latch means (a) and said coupling means (b) each normally biased in engaging and coupling relation in their respective operative positions;
(c) cam means coacting at a predetermined point between the frame and said coupling means to automatically disengage said coupling means on retraction of said shuttles in coupled condition relative to the frame;
(d) other cam means coacting between the lower shuttle and the upper shuttle latch means to disengage said latch means in response to integrated movement of the lower shuttle relative to the frame; and
(e) means coacting between said latch means and said coupling means in the retracted position of said upper shuttle to maintain said coupling means engaged until said latch means are engaged to permit further retraction of said lower shuttle relative to said upper shuttle.

References Cited by the Examiner

UNITED STATES PATENTS

| | | | |
|---|---|---|---|
| 1,241,053 | 9/17 | Stuart | 214—14 |
| 1,313,375 | 8/19 | Frazier | 214—14 X |
| 1,321,025 | 11/19 | Frazier | 214—14 |
| 1,422,492 | 7/22 | Stuart | 198—88 |
| 1,442,521 | 1/23 | Case | 214—14 X |
| 1,943,869 | 1/34 | Kendall | 214—14 X |
| 3,009,586 | 11/61 | Isbrandtsen | 214—15 |
| 3,107,795 | 10/63 | Young et al. | 214—14 |

FOREIGN PATENTS 626,773   3/36   Germany.

HUGO O. SCHULZ, *Primary Examiner*.

GERALD M. FORLENZA, *Examiner*.